(12) United States Patent
Paulramachandran et al.

(10) Patent No.: US 11,252,131 B2
(45) Date of Patent: *Feb. 15, 2022

(54) OBFUSCATION OF EMAIL ADDRESSES

(71) Applicant: Groupon, Inc., Chicago, IL (US)

(72) Inventors: Karthik Paulramachandran, Kamarajapuram (IN); Rajeev Kumar, Nalanda (IN); Ganesh Angappan, Ramapuram (IN); Ramya J, Besant Nagar (IN)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,535

(22) Filed: Dec. 15, 2020

(65) Prior Publication Data

US 2021/0176214 A1 Jun. 10, 2021

Related U.S. Application Data

(63) Continuation of application No. 16/432,167, filed on Jun. 5, 2019, now Pat. No. 10,897,454, which is a continuation of application No. 15/664,605, filed on Jul. 31, 2017, now Pat. No. 10,356,051, which is a continuation of application No. 14/279,933, filed on May 16, 2014, now Pat. No. 9,756,000.

(51) Int. Cl.
*H04L 29/06* (2006.01)
*H04L 12/58* (2006.01)

(52) U.S. Cl.
CPC .......... *H04L 63/0407* (2013.01); *H04L 51/28* (2013.01)

(58) Field of Classification Search
CPC ............................ H04L 63/0407; H04L 51/28
See application file for complete search history.

(56) References Cited

U.S. PATENT DOCUMENTS

| | | | |
|---|---|---|---|
| 8,775,820 B1 * | 7/2014 | Freeburne | H04L 63/0838 713/184 |
| 2005/0114453 A1 | 5/2005 | Hardt | |
| 2007/0299920 A1 * | 12/2007 | Crespo | G06Q 30/0603 709/206 |
| 2008/0235336 A1 * | 9/2008 | Stern | H04L 63/0407 709/206 |

OTHER PUBLICATIONS

U.S. Appl. No. 16/432,167, filed Jun. 5, 2019, U.S. Pat. No. 10,897,454, Issued.
U.S. Appl. No. 15/664,605, filed Jul. 31, 2017, U.S. Pat. No. 10,356,051, Issued.
U.S. Appl. No. 14/279,933, filed May 16, 2014, U.S. Pat. No. 9,756,000, Issued.

\* cited by examiner

*Primary Examiner* — Suraj M Joshi
(74) *Attorney, Agent, or Firm* — Alston & Bird LLP

(57) ABSTRACT

A method, apparatus, and computer program product are disclosed for facilitating two-way email communication in manner that obfuscates sender and recipient email addresses. The method includes receiving a correspondence request indication; assigning a first transaction address to a sender and a second transaction address to a recipient; receiving a message from the sender; associating the message from the sender with the first transaction address; and causing a transmission of the message from the sender to the recipient using the first transaction address. A corresponding apparatus and computer program product are also provided.

20 Claims, 5 Drawing Sheets

OBFUSCATION OF EMAIL ADDRESSES

CROSS-REFERENCE TO RELATED APPLICATIONS

The present application is a continuation of U.S. patent application Ser. No. 16/432,167, filed Jun. 5, 2019, which is a continuation of U.S. patent application Ser. No. 15/664,605, filed Jul. 31, 2017, now U.S. Pat. No. 10,356,051, issued Jul. 16, 2019, which is a continuation of U.S. patent application Ser. No. 14/279,933, filed May 16, 2014, now U.S. Pat. No. 9,756,000, issued Sep. 5, 2017, the contents of which are incorporated herein by reference in their entireties.

TECHNOLOGICAL FIELD

Example embodiments of the present invention relate generally to email and, more particularly, to a method and apparatus for email address obfuscation between senders and recipients.

BACKGROUND

Applicant has discovered problems with existing methods and systems for email communications. Through applied effort, ingenuity, and innovation, Applicant has solved many of these identified problems by developing a solution that is embodied by the present invention and described in detail below.

BRIEF SUMMARY

Accordingly, a method, apparatus, and computer program product are provided for generating a promotion in an augmented reality. In an example embodiment a method is provided including receiving a correspondence request indication; assigning a first transaction address to a sender and a second transaction address to a recipient; receiving a message from the sender; associating the message from the sender with the first transaction address; and causing a transmission of the message to the recipient using the first transaction address.

In an example embodiment, the method also includes receiving a recipient message from the recipient; associating the recipient message with the second transactional address; and causing a transmission of the recipient message to the sender using the second transaction address. In an example embodiment in which the message from the sender is associated with the second transaction address, the method also includes associating the message with the recipient address; and causing the transmission of the message from the sender to the recipient includes using the recipient address. In an example embodiment in which the recipient message is associated with the with the first transaction address, the method also includes associating the recipient message with the sender address; and causing the transmission of the recipient message to the sender further comprises using the sender address.

In an example embodiment of the method, the first and second transaction addresses are associated with a transaction. In an example embodiment of the method, the first and second transaction addresses are valid for a transaction period. In an example embodiment of the method, the transaction period is terminated in response to completion of a transaction. In an example embodiment of the method, the transaction period is a predetermined period of time associated with the transaction.

In an example embodiment in which the assigning the first transaction address to the sender and the second transaction address to the recipient also includes: generating each of the first and second transaction addresses by encoding a sender email address and a recipient email address with at least one of a transaction identifier, a consumer identifier, a provider identifier, a date/time identifier, and an account identifier. In an example embodiment of the method, the encoding comprises hashing.

In an example embodiment an apparatus is provided including at least one processor and at least one memory including computer program code, the at least one memory and computer program code configured to, with the processor, cause the apparatus to at least: receive a correspondence request indication; assign a first transaction address to a sender and a second transaction address to a recipient; receive a message from the sender; associate the message from the sender with the first transaction address; and cause a transmission of the message to the recipient using the first transaction address.

The at least one memory and computer program code may be further configured to, with the processor, cause the apparatus of an example embodiment to receive a recipient message from the recipient; associate the recipient message with the second transactional address; and cause a transmission of the recipient message to the sender using the second transaction address. In an example embodiment the message from the sender is associated with the second transaction address, the at least one memory and the computer program code may be further configured to, with the processor, cause the apparatus to associate the message with the recipient address; and causing the transmission of the message from the sender to the recipient further comprises using the recipient address. In an example embodiment in which the recipient message is associated with the with the first transaction address, the at least one memory and the computer program code may be further configured to, with the processor, cause the apparatus to associate the recipient message with the sender address; and causing the transmission of the recipient message to the sender further comprises using the sender address.

In an example embodiment of the apparatus, the first and second transaction addresses are associated with a transaction. In an example embodiment of the apparatus, the first and second transaction addresses are valid for a transaction period. In an example embodiment of the apparatus, the transaction period is terminated in response to completion of a transaction. In some example embodiments of the apparatus, the transaction period is a predetermined period of time associated with the transaction.

In an example embodiment of the apparatus, assigning the first transaction address to the sender and the second transaction address to the recipient also includes generating each of the first and second transaction addresses by encoding a sender email address and a recipient email address with at least one of a transaction identifier, a consumer identifier, a provider identifier, a date/time identifier, and an account identifier. In some example embodiments of the apparatus, the encoding comprises hashing.

In a further example embodiment, a computer program product is provided including at least one non-transitory computer readable storage medium having computer executable code portions stored therein, the computer-executable program code portions comprising program code instructions configured to receive a correspondence request indication; assign a first transaction address to a sender and a second transaction address to a recipient; receive a message from the sender; associate the message from the sender with the first transaction address; and cause a transmission of the message to the recipient using the first transaction address.

In an example embodiment the computer-executable program code portions of may include program code instructions to receive a recipient message from the recipient; associate the recipient message with the second transactional address; and cause a transmission of the recipient message to the sender using the second transaction address.

In an example embodiment in which the message from the sender is associated with the second transaction address, the computer-executable program code portions of the computer program product may include program code instructions to associate the message with the recipient address; and causing the transmission of the message from the sender to the recipient further comprises using the recipient address. In an example embodiment in which the recipient message is associated with the with the first transaction address, the computer-executable program code portions of the computer program product may include program code instructions to associate the recipient message with the sender address; and causing the transmission of the recipient message to the sender further comprises using the sender address.

In an example embodiment of the computer program product, the first and second transaction addresses are associated with a transaction. In an example embodiment of the computer program product, the first and second transaction addresses are valid for a transaction period. In an example embodiment of the computer program product, the transaction period is terminated in response to completion of a transaction. In an example embodiment of the computer program product, the transaction period is a predetermined period of time associated with the transaction.

In an example embodiment of the computer program product assigning the first transaction address to the sender and the second transaction address to the recipient also includes generating each of the first and second transaction addresses by encoding a sender email address and a recipient email address with at least one of a transaction identifier, a consumer identifier, a provider identifier, a date/time identifier, and an account identifier. In an example embodiment of the computer program product, the encoding comprises hashing.

In yet another example embodiment, an apparatus is provided that includes means for receiving a correspondence request indication; means for assigning a first transaction address to a sender and a second transaction address to a recipient; means for receiving a message from the sender; means for associating the message from the sender with the first transaction address; and means for causing a transmission of the message to the recipient using the first transaction address.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
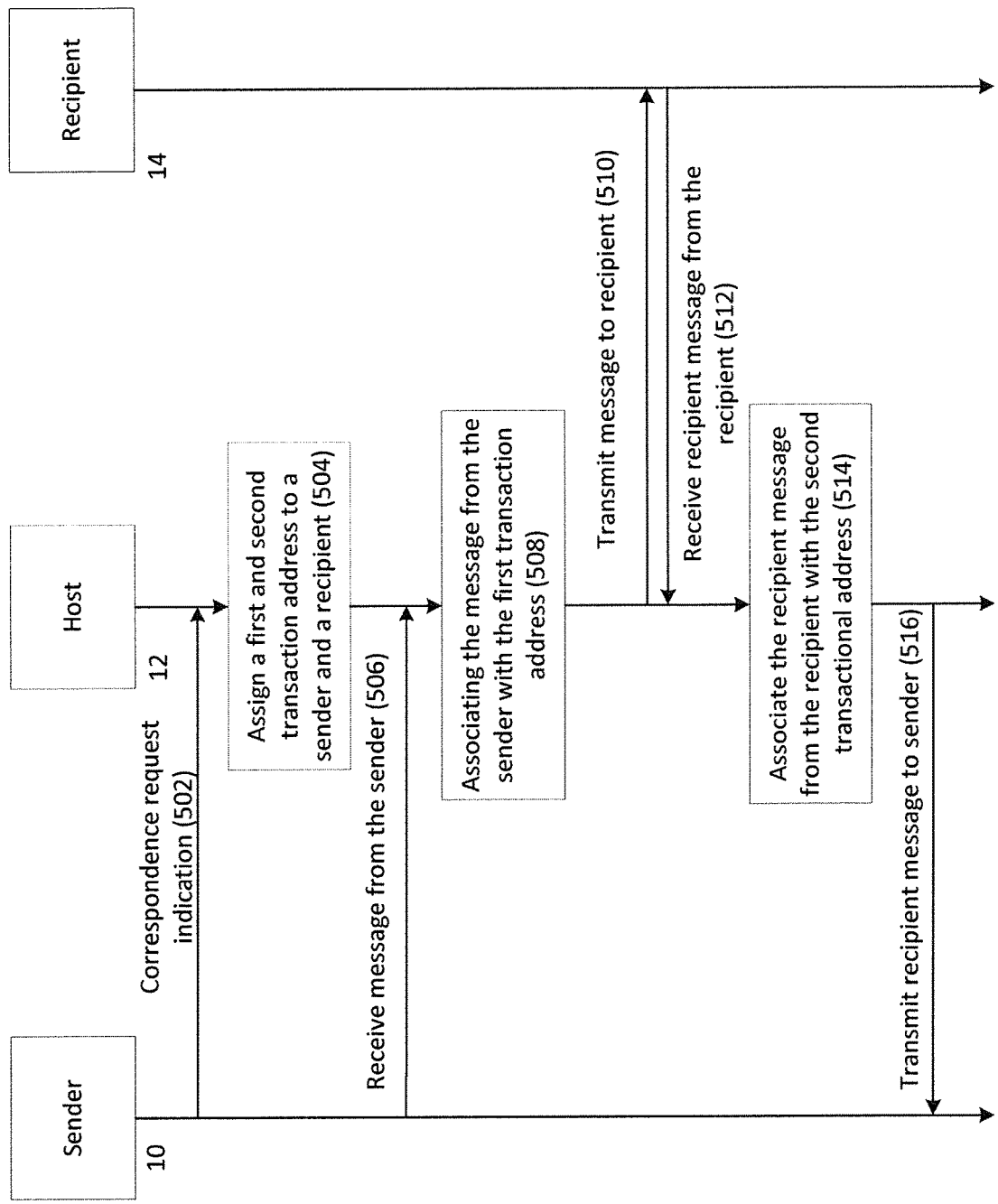
Figure 2:
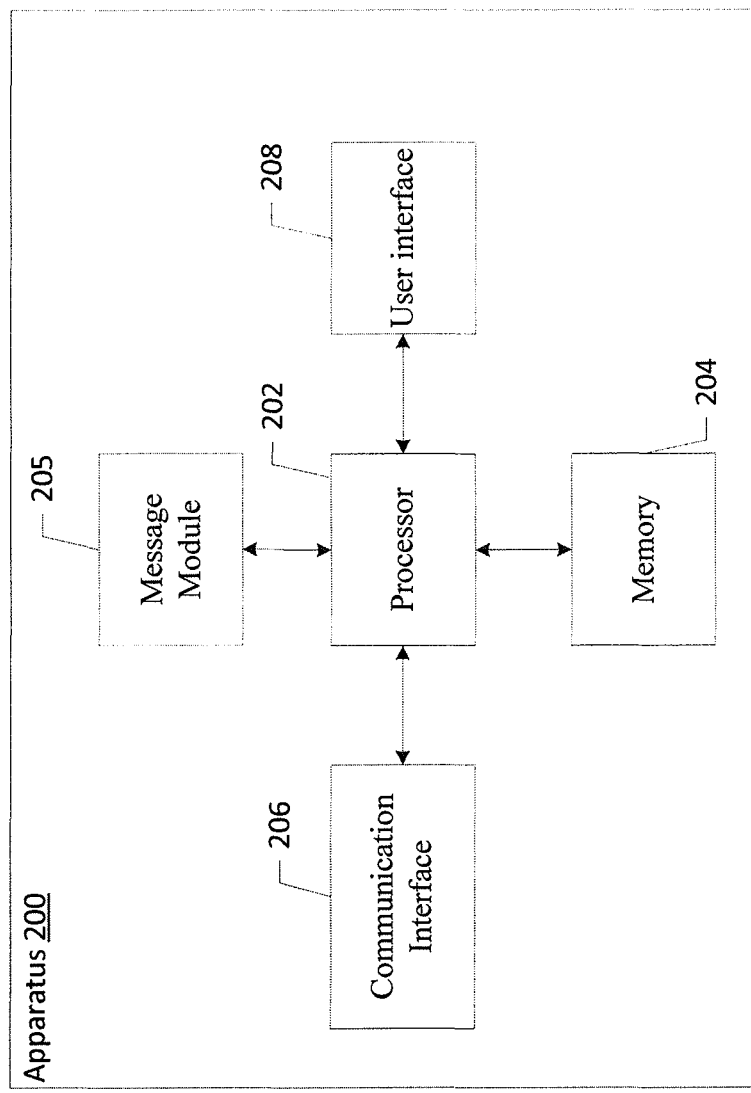
Figure 3:
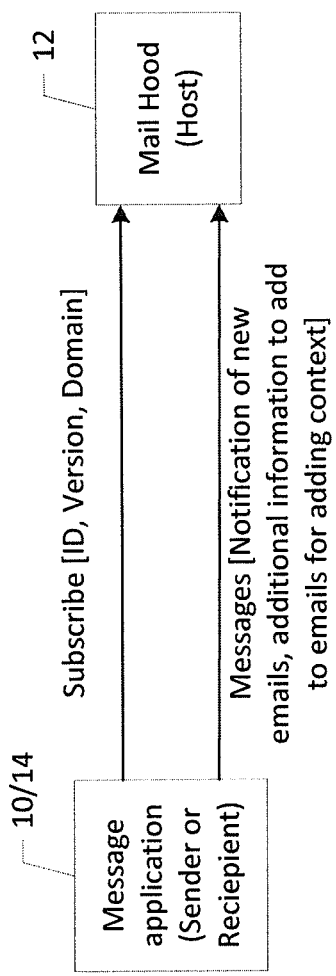
Figure 4:
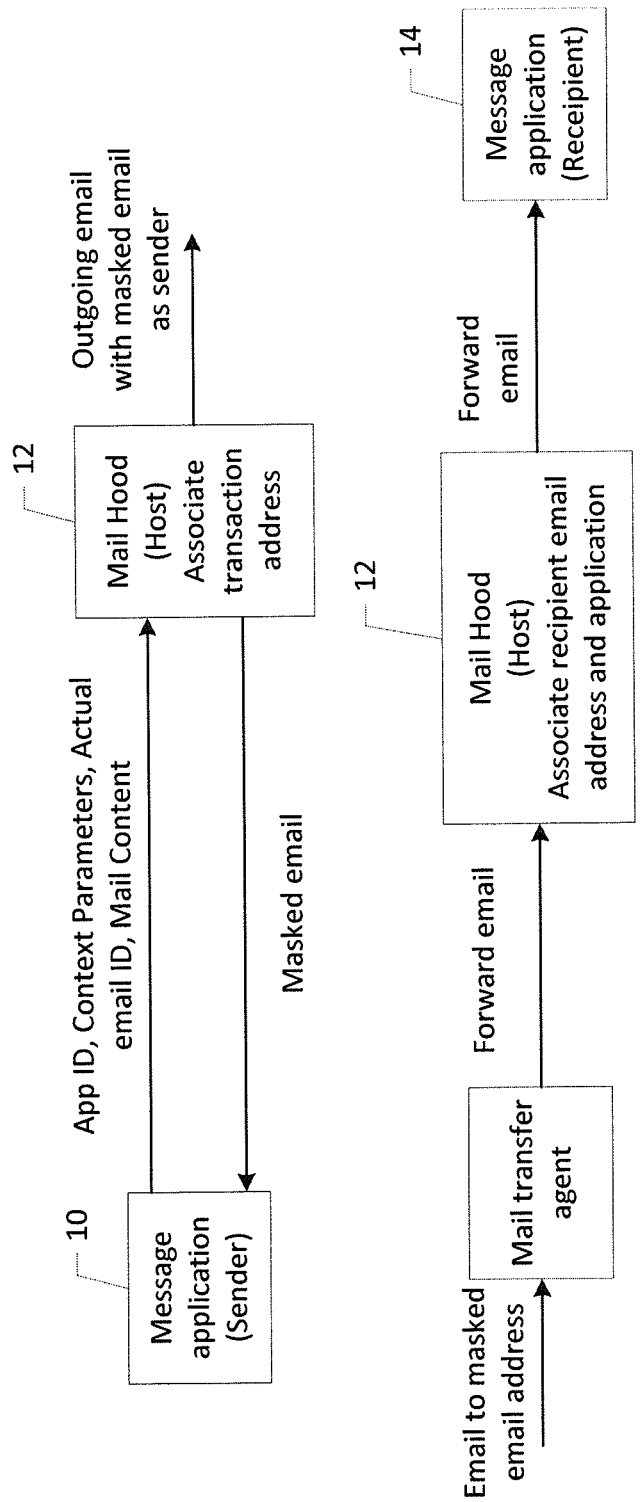
Figure 5:
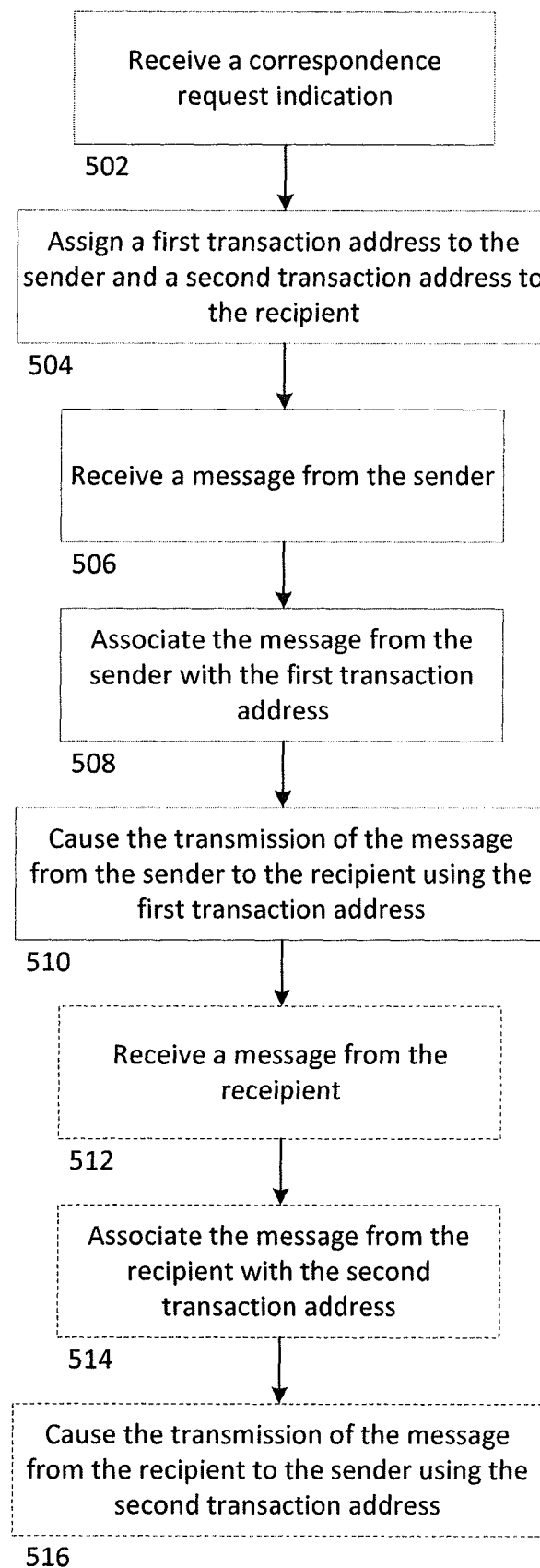

Having thus described certain example embodiments of the present disclosure in general terms, reference will now be made to the accompanying drawings, which are not necessarily drawn to scale, and wherein:

FIG. 1 illustrates an example data flow path for obfuscating email addresses in accordance with an example embodiment of the present invention;

FIG. 2 illustrates block diagram of an apparatus that may be specifically configured for obfuscation of email addresses in accordance with an example embodiment of the present invention;

FIG. 3 illustrates example data flows from a sender or recipient message application to a host in accordance with some example embodiments of the present invention;

FIG. 4 illustrates example data flow paths from a sender message application to a recipient message application in accordance with some example embodiments of the present invention; and FIG. 5 illustrates a flow chart of an example process for obfuscation of email addresses in accordance with an example embodiment of the present invention.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, merchant, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example a provider may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "impression" may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

A "consumer" may be identified by one or more profiles, or sub-profiles, where each profile or sub-profile includes one or more consumer attribute that describes the consumer. Consumer attributes may include, but are not limited to, the consumer's name, consumer's age, consumer's location (e.g., "home", "work", or other visited places such as future vacation locations, cities that friends and/or family live in locations, business trip locations and the like), consumer's gender, consumer's tenure using the promotion system, consumer's email domain, consumer's IP address, consumer's occupation, consumer's educational background, consumer's previously accepted and/or rejected promotion program offerings, consumer's gender and the like. The consumer attributes may be inputted into the consumer's profile by the consumer, or collected by components within the promotion system 100 and inputted into the consumer's profile.

Overview

A method, apparatus, and computer program product are provided in accordance with an example embodiment of the present invention in order to obfuscate email addresses in correspondence between a sender and recipient. In some embodiments, the obfuscation of the email addresses is associated with facilitating a transaction occurring between the sender, recipient, and/or one or more intermediary parties (e.g., providers, promotion and marketing service, etc.).

Using email to correspond with providers, consumers, other recipients may allow the sender's email address to be acquired or harvested for unwanted communications. Many types of software exist to automatically collect email addresses for bulk harvesting. Such collected email addresses may then be used in manner that is inconsistent with the wishes of the sender (e.g., bulk advertising, spamming, phishing, etc.).

Some systems may create a single use email obfuscation by creating a proxy email relay, but if the recipient responds, any response form the sender back to the recipient would not be obfuscated. Other systems may allow for masking of emails from one party, but not the other, by obfuscating email senders upon request. The recipient email address is not obfuscated and may thus be used by the sender for any purpose.

Various embodiments of the present invention are configured to obfuscate both sender and recipient email addresses. In particular, such embodiments are configured to assign a first transaction address to a sender and a second transaction address to a recipient. Preferably, in one embodiment, the first transaction address and the second transaction address are valid or recognized by the system in connection with only one transaction as described in greater detail below. In another embodiment, the first transaction address and the second transaction address are valid or recognized by the system only for a predetermined period of time.

Obfuscated Email Address Data Flow Path

FIG. 1 illustrates a data flow path for obfuscating email addresses in accordance with an example embodiment of the present invention. Data may be transmitted, received, and/or manipulated by sender 10, a host 12, or a recipient 14. The numbering of data transmissions and manipulations in FIG. 1 is consistent with the block numbering of the process for obfuscating email addresses in FIG. 5.

A sender 10 may be a consumer communicating with another consumer, a consumer communicating with a provider, or a provider communicating with a consumer. For example, the consumer may listen to or view an advertisement for a promotion presented via the Internet, radio, television, mail, over a mobile device application, in person, or the like and desire more information or commence a transaction to procure the promotion. In another example, a consumer may read a review by a consumer and desire further information about the transaction or the promotion. In still another example, a consumer may wish to solicit quotes, bids, or information from one or more providers (e.g., merchants). In each case, a sender 10 may be motivated to send an email to a recipient 14.

Senders 10 and recipients 14 (e.g., consumers and/or providers) may subscribe to or otherwise identify themselves to a host 12 through registration, or other information gathering process. In some embodiments, the host 12 may be operated by a promotion and marketing service or other third party intermediary. The senders 10 and recipients 14 may enter information such as name, address, phone number, email address, preferences, services or goods offered, or the like. Such information may be stored at the host 14 in the form of a user profile.

Once the senders 10 and recipients 14 are registered with the host 12, they may be assigned an identifier (e.g., a unique ID, code, etc.) that may be stored with other information to an appropriate user profile. In some embodiments, the identifier may be an email address dedicated for host 12 to sender 10/recipient 14 communications. For example, if the host 12 is a promotion and marketing service such as Groupon, Inc., the host 12 may pair a unique ID associated with a sender/recipient with a domain associated with a host 12 to form an identifier in the form of an email address (e.g., consumer1234@groupon.com or provider4567@groupon.com, etc.). Identifiers of this type may be used by the host 12 to facilitate host 12 to sender 10/recipient 14 communications.

As will be apparent to one of ordinary skill in the art in view of this disclosure, user profiles that are accessible by the host 12 may comprise consumer information, provider information, consumer identifiers, provider identifiers, group provider identifiers (e.g., identifiers associated with a group of providers such as a chain of merchants). Such information may be used by the host 12 to facilitate sender 10 to recipient 14 and host 12 to sender 10/recipient 14 communications as herein described.

For illustration and clarity purposes, the foregoing description proceeds by referring to a particular type of sender 10, a consumer, and a particular type of recipient, a provider (e.g., merchant). In particular, the foregoing description describes an example embodiment wherein a consumer communicates through a host to a provider in order to obtain additional information to support the purchase of a good offered by the provider. However, as will be apparent to one of ordinary skill in the art, various embodiments of the present invention are not limited to consumer to provider communications and may be applied to numerous communication pathways including, without limitation, consumer to consumer, provider to consumer, provider to provider, and the like.

In some embodiments, a sender 10 initiates communication with a recipient 14 by transmitting a correspondence request indication 502 to the host 12. For example, in the illustrated embodiment, a consumer viewing an impression (e.g., a web based or mobile application based advertisement/product description) associated with a good (e.g., a new television) offered by a provider via a promotion and marketing service may desire more information concerning the good (e.g., how many HDMI input ports does the television have?) before purchasing the good. The consumer may, for example, click or select an "ask a question" link presented by a website or mobile application interface proximate the impression. Clicking such a link may cause a correspondence request indication to be sent to host 12 as shown in FIG. 1.

In other embodiments, a correspondence request indication may be triggered by the sender 10 in a variety of other ways. For example, in some embodiments, the correspondence request indication may be initiated by a sender submitting a webform, or using a predetermined email address in the recipient field of an email in a local message user agent (MUA), such as Microsoft Outlook®, or an internet based MUA, such as Gmail®. In other examples, a correspondence request indication may be triggered by initiating a purchase (e.g. selecting a buy link or button, or a submit payment link or button), requesting an appointment or reservation, initiating or responding to a comment or review on a website or discussion forum, or the like.

The host 12 may receive the correspondence request indication (504), which may include, without limitation, the sender email address, a recipient identifier, a recipient group identifier, or the like. The host 12 may generate and assign a first transaction address to the sender and a second transaction address to a recipient 14. The host 12 may generate the transaction addresses based on the sender email address, the recipient email address, a sender and/or recipient identifier, recipient group identifier, a transaction identifier, a date and/or time identifier, an account identifier, or the like. In some instances, the transaction addresses may be derived from the correspondence request indication. For example, a timestamp associated with the correspondence request indication may be used to encode sender/or recipient information.

Returning to the depicted embodiment, the host 12 may generate and assign the following transaction addresses:
first transaction address: 4868985506@hostcompany.com
second transaction address: 212700048@hostcompany.com Each transaction address includes a domain (hostcompany.com) associated with the company (e.g., promotion and marketing service) that operates host 12. The local part of the transaction addresses (i.e., 4868985506 and 212700048 respectively) were determined by using a transaction identifier to hash respective identifiers associated with the consumer and the provider. In particular, host 12 assigned transaction number 45683 (i.e., transaction identifier) to correspondence request indication 502 and then multiplied this transaction number by a sender identifier (e.g., consumer account number 106582) to obtain the local part of the first transaction address (i.e., 4868985506). Similarly, host 12 multiplied the transaction number 45683 by a recipient identifier (e.g., provider number 4656) to obtain the local part of the second transaction address (i.e., 212700048).

In some example embodiments, the host 12 may generate the transaction addresses by encoding sender and/or recipient email addresses and at least one of the sender and/or recipient identifier, recipient group identifier, a transaction identifier, a date and/or time identifier, an account identifier, or the like. In an example the encoding is a hashing function of the respective email address and identifier. For example, the local portion of the email address may be translated and added to the identifier as a numeric value. One such translation may be numeric substitution of non-numeric characters based on alphabetic sequence, e.g. a=1, b=2, c=3, etc., for example "consumer1234" may be translated to 315141921135181234. One skilled in the art would appreciate that the hashing function may be performed by other mathematical operations, such as subtraction, multiplication, division, or the like or by more complex methods.

$$f(x) = \text{sender address identifier} + \text{identifier}(x)$$

$$f(x) = \text{recipient address identifier} + \text{identifier}(x)$$

Using the above equation, the example sender address identifier (e.g. consumer1234=315141921135181234 may be added to the transaction identifier (e.g. 45683) resulting in a transaction address local portion of 315141921135226917. The local portion may be appended to the host domain to result in a first transactional address 315141921135226917@hostcompany.com. Continuing the example, provider4567@groupon.com may be hashed as discussed resulting in a second transaction address of 116181522945230250@hostcompany.com.

In an example embodiment, the encoding may be based on a cryptographic hash function utilizing the alphanumeric representations of the transaction and user (e.g. consumer or merchant identifiers, such as secure hash algorithm 1 (SHA1). The cryptologic hash function may hash stringified representations of the data structure containing the alphanumeric identifiers. The stringified representation may be the binary language for the transaction or user identifier converted to alphanumeric text for the hashing process. The resulting stringified hashed representation may be utilized as the local portion of the transactional address.

Encoding the email address identifier and respective second identifier by hashing is illustrated as an example, it would be apparent to one of ordinary skill in the art, that any encoding method which obfuscates the email identifier of the sender and recipient could be used, such as substitution, or more complex encoding processes.

The host 12 may assign a transactional address to the sender 10 and a transactional address to the recipient 14. The host 12 may identify subsequent messages based on the sender and/or recipient transactional address or identifiers.

The transactional addresses may be assigned for a transaction period such as a single transaction, transaction group, or the like. The transaction addresses may be valid for the transaction period. In an example, the transaction addresses may be assigned for the duration of a transaction, such as from the request or purchase of the good, service, or promotion, until redemption. In this example, the transaction period may be terminated in response to the completion of the transaction.

In an example embodiment the transactional addresses may be assigned and valid for a time period associated with the transaction, for example a period before and after the transaction, or in an instance in which the transaction would not have a natural expiration such as completion of a purchase or participation in a purchased event. In an example, the transaction addresses are assigned for a predetermined period after the redemption or competition of the transaction to allow for feedback, inspections, questions about the product or service, or the like. In an example in which a consumer or provider is requesting information about a review, the transaction addresses may be assigned to the transaction of information for a predetermined period, such as one week, one month, or any other period of time.

In an example embodiment, the sender 10 and/or the recipient 14 may extend the transaction period, thus extending the validity of the transaction addresses by contacting the host 12. For example, the consumer or provider may desire to extend the transaction period associated with the transaction addresses to resolve issues arising from the transaction, conduct a related transaction, or the like.

The host 12 may receive a message from the sender 10 addressed to the recipient 14 (506). The message may be received contemporaneously with the correspondence request indication (502) or may be a subsequent message. The host 12 may identify a sender or receiver transactional address associated with the message. For example, the sender may be replying to a message received using the transaction address of the recipient. In another example in which the message is receive contemporaneously with the correspondence request indication, the host may identify the sender or recipient transaction address as a portion of the assignment of the first and second transaction addresses.

The host 12 may associate the message with the transaction address of the sender. The host 12 may identify the sender transactional address using the recipient transactional address, transaction identifier, sender email address, sender identifier, or the like. The sender transactional address may be retrieved from the subscriber management database or other data storage. The host 12 may associate the message with the sender transactional address by entering or substitution of the sender transactional address into the sender field of the message. For example, the sender address consumer1234@groupon.com may be substituted with 315141921135226917@hostcompany.com.

The host 12 may retrieve identify and retrieve the recipient email address based on transaction identifier, sender email address, sender identifier, recipient transactional address, recipient identifier, or the like. In an instance in which the message is addressed to the recipient using the second transactional address assigned to the recipient, the host 12 may enter or substitute the recipient address into the recipient field of the message.

For example in an instance in which a consumer sends a message from their personal email application, the consumer may enter or cause to be entered the transactional address or recipient identifier of the recipient in the recipient field (e.g. 116181522945230250@hostcompany.com.) The host 12 may identify the sender's email address (e.g. consumer1234@groupon.com) and associated transactional address (e.g. 315141921135226917@hostcompany.com) and substitute the sender's email address with the sender's transactional address. The host 12 may identify the transactional address and associated recipient's email address and substitute the recipient transactional address (e.g. 116181522945230250@hostcompany.com) with the recipient's email address (e.g. provider4567@groupon.com). Therefore, allowing the recipient to receive the message at their respective email application and maintain the anonymity of the sender and sender email address, respective to the recipient and the anonymity of the recipient and recipient email address, respective to the sender.

In an example embodiment in which the sender sends the message using a "ask a question" link associated with webform, the sender address field may be filled by the first transactional address and the recipient address identified and entered in to the recipient address field of the message by the host 12.

The host 12 may transmit the message from the sender to the recipient using the transactional address of the sender (e.g. 315141921135226917@hostcompany.com) and email address (e.g. provider4567@groupon.com) of the recipient (510). The host 12 may transmit the message to the recipient using the email addresses as described above.

The recipient 14 may respond to the sender by composing a message in which the sender's transactional address or sender identifier is used in the recipient field. For example, the recipient may compose a reply message stating that "The HDTV has four HDMI ports.", in response to the message from the sender. In an instance in which the recipient is replying the message application may fill the recipient and sender fields based on the message received from the sender. For example, the sender field may be the recipient address (e.g. provider4567@groupon.com) and the recipient field may be the sender transactional address (e.g. 315141921135226917@hostcompany.com). The host 12 may receive the message from the recipient 14 to the sender 10 (512).

The host 12 may associate the message from the recipient with the transactional address associated with the sender 10 (514). As discussed above, the host 12 may identify the transactional address and email address of the sender 10 and recipient 14 respectively. The host 12 may substitute the email address (e.g. provider4567@groupon.com) of the recipient 14 with the transactional address (e.g. 3818916456@hostcompany.com) associated with the recipient. The host 12 may also substitute the transactional address (e.g. 315141921135226917@hostcompany.com) of the sender 10 with the sender's email address (e.g. consumer1234@groupon.com) retrieved from a memory, such as a subscriber management database.

The host 12 may transmit the message from the recipient 14 to the sender (516) using the transactional addresses and email addresses as described above.

In an example embodiment, the correspondence request indication may be generated in response to the selection of a "purchase" or "buy" link presented by a website or mobile application interface proximate the impression. The correspondence request indication may be sent to the host 12 as described above.

The obfuscation of email addresses in both directions of communications allows for the email addresses to be used for the course of the transaction without risk of loss of privacy to the email account holders. Further, the use of the transactional addresses creates a distinguishable communication chains associated with the transaction.

Example Apparatus

The host 12 may be embodied by an apparatus, such as apparatus 200 shown in FIG. 2. As illustrated in FIG. 2, the apparatus 200 may include a processor 202, a memory 204, a user interface 206, a communications module 208, and a message module 205, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include a user interface 206 that may, in turn, be in communication with processor 202 to provide output to the user and, in some embodiments, to receive an indication of a user input. As such, the user interface 206 may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor 202, or user interface circuitry comprising the processor 202, may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The message module 205 may be configured to cause the processor 202 to transmit a message from a sender to a recipient using transactional addresses. In an example embodiment, the message module 205 may receive a correspondence request indication; assign a first transaction address to a sender and a second transaction address to a recipient; receive a message from the sender; associate the message from the sender with the second transaction address; and cause a transmission of the message from the sender to the recipient using the second transaction address. In an example, the message module 205 may also receive a message from the recipient; associate the message from the recipient with the first transactional address; and causing a transmission of the message from the recipient to the sender using the first transaction address. In yet another embodiment, the message from the sender may be associated with the second transaction address, the message module 205 may associate the message with the recipient address; and the transmission of the message from the sender to the recipient further comprises using the recipient address. In still another example, the recipient message may be associated with the first transaction address, the message module 205 may associate the recipient message with the sender address; and the transmission of the recipient message to the sender further comprises using the sender address.

Example Data Flow from a Message Application to the Host

Referring now to FIG. 3, the data flows from a sender 10 or recipient 14 message application to the host 12 are illustrated. The message application may be a MUA or a webform. The following illustration is made from the sender perspective; however one skilled in that art would understand that the process may be performed similarly for the recipient perspective. The sender may send information to the host 12 to identify the sender and their associated email address, such as an email address or a consumer/provider identifier, or the like. In some embodiments the sender provides only contact information such as an email identifier (local portion), domain, and the version of the message application. The local portion, domain, and version may be derived from the transmission of an email.

In another example, the sender may provider further information such as name, age, phone number, alternate email addresses, preferences, relationship status, or the like. The additional information may be derived from a subscription to a service, creation of an online account or user profile as discussed in FIG. 1, or the like.

The host 12 may use the sender email address local portion, domain, and application version in the generation of transaction addresses as discussed in FIG. 1. Further, the host may store the sender email address local portion, domain, application version or the like in a memory, such as a subscription management database, and may associate the information with a user profile.

The sender 10 or recipient 14 message application may transmit messages to the host 12 for transmission to the respective recipient as described in FIG. 1. The messages may be received in conjunction with a correspondence request indication or be preceded by a correspondence request indication as discussed in FIG. 1.

Example Data Flow from a Sender Message Application to a Recipient Message Application FIG. 4 illustrates example data flow paths from a sender message application to a recipient message application. The sender 10 message application may transmit a message to the host 12. The message may include a message application identifier, message context parameters, the sender's email address, including sender email identifier, the message content, or the like.

The host 12 may receive the message and associate the transaction address associated with the sender with the message. The host 12 may substitute the sender's email address with the transaction address, as discussed in FIG. 1. Additionally, in an instance in which the message application has addressed the message to a recipient identifier or predetermined email address, the host 12 may associate the recipient identifier or predetermined email address with a transaction address associated with the recipient. The message may then be transmitted by the host 12 using the transaction address associated with the sender and the transaction address associated with the recipient. In an example embodiment the host 12 may transmit a copy of the obfuscated email to the sender for the purposes of confirmation of the message and/or obfuscation.

In an example embodiment the host 12 may be separate hosts for the sending and receiving of messages, utilizing common transaction address data. The message may be relayed through one or more message transfer agents (MTAs) before or after the respective hosts 12. The MTA may transmit the message to the host 12. The host 12 may receive the message from the MTA and identify the recipient based on the recipient transaction address. The host 12 may identify the recipient email address and recipient message application and associate the message with the recipient email address by substitution or entry of the recipient address in the recipient field of the message. The host 12 may also format the message for compatibility with the recipient message application.

The host 12 may send the message to the recipient using the recipient's address. In some embodiments, the host 12 may send a confirmation of delivery to the sender 10 associated with the transmission of the message to the recipient. Although FIG. 4 illustrates the data flow from the sender to a receiver, it would be apparent to one of ordinary skill in the art that the process may be used to transmit a message from the recipient to the sender as discussed in FIGS. 1 and 5.

Example Process for Email Address Obfuscation

Referring now to FIG. 5, the operations performed, such as by the apparatus 200 of FIG. 2, for obfuscation of email addresses are illustrated. As shown in block 502 of FIG. 5, the apparatus may include means, such as a message module 205, processor 202, communications interface 206, or the like, for receiving a correspondence request indication. A correspondence request indication may be a first message, as discussed below in block 506, a subscription to an online service, a request for information from a webform or internet link, or the like. The correspondence request indication may be initiated by submitting a webform, or using a predetermined email address in the recipient field of an email in a local message user agent (MUA), such as Microsoft Outlook®, or an internet based MUA, such as Gmail®. In other examples, a correspondence request indication may be triggered by initiating a purchase (e.g. selecting a buy link or button, or a submit payment link or button), requesting an appointment or reservation, initiating or responding to a comment or review on a website or discussion forum, or the like.

The correspondence request indication may include the email address identifier, domain and application version of the sender 10, the provider identifier, consumer identifier, consumer group identifier, provider group identifier, transaction identifier, date/time identifier or the like.

As shown in block 504 of FIG. 5, the apparatus 200 may include means, such as a message module 205, a processor 202, or the like for assigning a first transaction address to the sender and a second transaction address to the recipient. The processor 202 may generate the transaction addresses by encoding the email addresses of the sender and or recipient with at least one of a sender and/or recipient identifier, recipient group identifier, a transaction identifier, a date and/or time identifier, an account identifier, or the like. In some instances the identifiers and email addresses may be derived from the correspondence request indication as an entered information elements. In another embodiment the processor 202 may retrieve at least a portion of the information or addresses from a memory 204, such as a subscriber management database based on a recipient or sender identifier or predetermined email address.

In an example embodiment, the host may generate the transaction addresses by encoding the sender and/or recipient email address and at least one of the sender and/or recipient identifier, recipient group identifier, a transaction identifier, a date and/or time identifier, an account identifier, or the like.

For example, the processor 202 may generate and assign the following transaction addresses:
first transaction address: 4868985506@hostcompany.com
second transaction address: 212700048@hostcompany.com Each transaction address includes a domain (hostcompany.com) associated with the company (e.g., promotion and marketing service) that operates host 12. The local part of the transaction addresses (i.e., 4868985506 and 212700048 respectively) were determined by using a transaction identifier to hash respective identifiers associated with the consumer and the provider. In particular, processor 202 assigned transaction number 45683 (i.e., transaction identifier) to correspondence request indication 502 and then multiplied this transaction number by a sender identifier (e.g., consumer account number 106582) to obtain the local part of the first transaction address (i.e., 4868985506). Similarly, processor 202 multiplied the transaction number 45683 by a recipient identifier (e.g., provider number 4656) to obtain the local part of the second transaction address (i.e., 212700048).

In an example the encoding is a hashing function of the respective email address and identifier. For example, the local portion of the email address may be translated and added to the identifier as a numeric value. One such translation may be numeric substitution of non-numeric characters based on alphabetic sequence, e.g. a=1, b=2, c=3, etc., for example "consumer1234" may be translated to 315141921135181234. One skilled in the art would appreciate that the hashing function may be performed by other mathematical operations, such as subtraction, multiplication, division, or the like or by more complex methods.

$$f(x)=\text{sender address identifier}+\text{identifier}(x)$$

$$f(x)=\text{recipient address identifier}+\text{identifier}(x)$$

Using the above equation, the example sender address identifier (e.g. consumer1234=315141921135181234 may be added to the transaction identifier (e.g. 45683) resulting in a transaction address local portion of 315141921135226917. The local portion may be appended to the host domain to result in a first transactional address 315141921135226917@hostcompany.com. Continuing the example, provider4567@groupon.com may be hashed as discussed resulting in a second transaction address of 116181522945230250@hostcompany.com.

In an example embodiment, the encoding may be based on a cryptographic hash function utilizing the alphanumeric representations of the transaction and user (e.g. consumer or merchant identifiers, such as secure hash algorithm 1 (SHA1). The cryptologic has function may hash stringified representations of the data structure containing the alphanumeric identifiers. The stringified representation may be the binary language for the transaction or user identifier converted to alphanumeric text for the hashing process. The resulting stringified hashed representation may be utilized as the local portion of the transactional address.

Encoding the email address identifier and respective second identifier by hashing is illustrated as an example, it would be apparent to one of ordinary skill in the art, that any encoding method which obfuscates the email identifier of the sender and recipient could be used, such as substitution, more complex encoding processes, or the like.

The processor 202 may assign a first transactional address to the sender 10 and a second transactional address to the recipient 14. The processor 202 may identify subsequent messages based on the sender and/or recipient transactional address and/or sender/recipient identifiers, or transaction identifiers.

In an embodiment in which a provider group identifier has been identified in the correspondence request indication recipient, the processor 202 may generate a transactional address for each of the perspective recipients when the transactional address for the sender is generated and assigned, or generate the respective recipient transaction addresses at the first response for each respective provider/recipient. For example, if the consumer requests information regarding the solicitation of quotes to a provider group, the consumer sender's transactional address may be generated and assigned. In an instance in which a provider responds to the message, a transactional address will be generated and assigned to the provider when the response is received by the processor 202.

In an example embodiment the transactional addresses may be assigned and valid for a time period associated with the transaction, for example a period before and after the transaction, or in an instance in which the transaction would not have a natural expiration such as completion of a purchase or participation in a purchased event. In another example, the transaction addresses are assigned for a predetermined period after the redemption or competition of the transaction to allow for feedback, inspections, questions about the product or service, or the like. In an example in which a consumer or provider is requesting information about a review, the transaction addresses may be assigned to the transaction of information for a predetermined period, such as one week, one month, or any other period of time. In yet another example the sender 10 and/or the recipient 14 may extend the transaction period, thus extending the validity of the transaction addresses by contacting the host 12. The consumer or provider may desire to extend the transaction period associated with the transaction addresses to resolve issues arising from the transaction, conduct a related transaction, or the like.

As shown in block 506 of FIG. 5, the apparatus 200 may include means, such as a message module 205, a processor 202, a communications module 206, or the like for receiving a message from the sender 10. The sender 10 may send the message to the apparatus 200 from a webform in an internet browser or a MUA. The message may include the sender email identifier, domain, and application identifier, context parameters, message content, recipient identifier, such as transaction address, predetermined email address or identifier, or the like. In some embodiments the message is received contemporaneously with the correspondence request 502.

As shown in block 508 of FIG. 5, the apparatus 200 may include means, such as a message module, a processor 202, or the like to associate the message with the sender or first transaction address. The processor 202 may use the recipient identifier, predetermined email address, sender email address, sender identifier, or the like to identify the transaction address associated with the sender. The processor 202 may associate the message with the sender or first transactional address, by substituting or entering the transactional address into the sender field of the message. For example, the sender address consumer1234@groupon.com may be substituted with 315141921135226917@hostcompany.com.

In an example embodiment, the processor 202 may also identify and retrieve the recipient address based on transaction identifier, sender email address, sender identifier, recipient transactional address, recipient identifier, or the like. In an instance in which the message is addressed to the recipient using the second transactional address assigned to the recipient, the processor 202 may enter or substitute the recipient address into the recipient field of the message.

For example in an instance in which a consumer sends a message from their personal email application, the consumer may enter or cause to be entered the transactional address or recipient identifier of the recipient in the recipient field (e.g. 116181522945230250@hostcompany.com. The processor 12 may identify the sender's email address (e.g. consumer1234@groupon.com) and associated transactional address (e.g. 315141921135226917@hostcompany.com) and substitute the sender's email address with the sender's transactional address. The processor 202 may identify the transactional address and associated recipient's email address and substitute the recipient transactional address (e.g. 116181522945230250@hostcompany.com) with the recipient's email address (e.g. provider4567@groupon.com).

As shown if block 510 of FIG. 5, the apparatus 200 may include means, such as a message module 205, a processor 202, a communications interface 206, or the like for causing the transmission of the message using the first transactional address. The processor may transmit the message to a MTA or to the MUA using the recipient email and use the first transactional address for the sender. The processor 202 may transmit the message from the sender to the recipient using the transactional address of the sender (e.g. 315141921135226917@hostcompany.com) and email address (e.g. provider4567@groupon.com) of the recipient.

As shown in block 512 of FIG. 5, the apparatus 200 may include means, such as a message module 205, a processor 202, a communications module 206, or the like for receiving a message from a recipient 14. The recipient may send a message from a MUA or webform in an internet browser. The message may include the recipient email identifier, domain, and application identifier, context parameters, message content, sender identifier, sender transaction address, or the like.

As shown if block 514 the apparatus 200 may include means, such as a message module 205, a processor 202, or the like for associating the message from the recipient with the recipient, or second, transaction address. The processor 202 may identify the transaction address associated with the recipient based on the recipient email address, recipient identifier, transaction identifier, sender, or first, transaction address, or the like. The processor 202 may associate the message with the second transaction address by entering or substituting the transaction address into the sender field of the message.

In an embodiment, in which the sender field is not populated with the sender or first transaction address, for example a sender identifier is entered; the processor 202 may associate the message with the first transaction address. The processor 202 may associate the message with the first transaction address by entering or substitution of the first transaction address into the recipient field for transmission to subsequent MTAs and/or the sender MUA.

For example, the processor 202 may substitute the email address (e.g. provider4567@groupon.com) of the recipient 14 with the transactional address (e.g. 3818916456@hostcompany.com) associated with the recipient. The processor 202 may also substitute the transactional address (e.g. 315141921135226917@hostcompany.com) of the sender 10 with the sender's email address (e.g. consumer1234@groupon.com) retrieved from a memory, such as a subscriber management database. As shown in block 516 of FIG. 5, the apparatus 200 may have means, such as a message module 205, processor 202, communications module 206, or the like for causing the transmission of the message from the recipient to the sender using the second transaction address. The processor 202 may transmit the message to the sender email address (e.g. consumer1234@groupon.com) using the recipient/second transaction address (e.g. 3818916456@hostcompany.com) in the sender field of the message.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for facilitating electronic correspondence between a sender and a recipient, the apparatus comprising at least one processor and at least one non-transitory memory including computer program code, wherein the at least one non-transitory memory and the computer program code are configured to, with the at least one processor, cause the apparatus to at least:
receive a correspondence request indication;
assign a transaction identifier to the correspondence request indication;
assign a sender identifier to the sender and a recipient identifier to the recipient;
generate a first local part of a first transaction address based at least in part on dividing the sender identifier by the transaction identifier, wherein the first transaction address comprises the first local part and a first domain part;
generate a second local part of a second transaction address based at least in part on dividing the recipient identifier by the transaction identifier, wherein the second transaction address comprises the second local part and a second domain part; and
assign the first transaction address to the sender and the second transaction address to the recipient.

2. The apparatus of claim 1, wherein the transaction identifier is associated with a transaction and valid for a transaction period, wherein the sender identifier and the recipient identifier are associated with the transaction and valid for the transaction period.

3. The apparatus of claim 2, wherein the at least one non-transitory memory and the computer program code are configured to, with the at least one processor, cause the apparatus to:
receive a transaction period adjustment indication; and
adjust the transaction period based on the transaction period adjustment indication.

4. The apparatus of claim 2, wherein the at least one non-transitory memory and the computer program code are configured to, with the at least one processor, cause the apparatus to further:
receive a first message from the sender;
associate the first message from the sender with the first transaction address;
cause a first transmission of the first message to the recipient using the first transaction address, wherein the first transaction address and the second transaction address are associated with the transaction and valid for the transaction period; and
receive a transaction complete indication.

5. The apparatus of claim 4, wherein the first message from the sender is associated with the second transaction address, wherein the at least one non-transitory memory and the computer program code are configured to, with the at least one processor, cause the apparatus to further associate the first message from the sender with a recipient address, wherein causing the first transmission of the first message from the sender to the recipient further comprises using the recipient address.

6. The apparatus of claim 4, wherein the at least one non-transitory memory and the computer program code are configured to, with the at least one processor, cause the apparatus to further:
receive a second message from the recipient;
associate the second message with the second transaction address; and
cause a second transmission of the second message to the sender using the second transaction address.

7. The apparatus of claim 6, wherein the second message is associated with the first transaction address, wherein the at least one non-transitory memory and the computer program code are configured to, with the at least one processor, cause the apparatus to further associate the second message with a sender address, wherein causing the second transmission of the second message to the sender is further based on the sender address.

8. A computer program product for facilitating electronic correspondence between a sender and a recipient, the computer program product comprising at least one non-transitory computer readable storage medium having computer executable code portions stored therein, the computer executable code portions comprising program code instructions configured to:
receive a correspondence request indication;
assign a transaction identifier to the correspondence request indication;
assign a sender identifier to the sender and a recipient identifier to the recipient;
generate a first local part of a first transaction address based at least in part on dividing the sender identifier by the transaction identifier, wherein the first transaction address comprises the first local part and a first domain part;
generate a second local part of a second transaction address based at least in part on dividing the recipient identifier by the transaction identifier, wherein the second transaction address comprises the second local part and a second domain part; and
assign the first transaction address to the sender and the second transaction address to the recipient.

9. The computer program product of claim 8, wherein the transaction identifier is associated with a transaction and valid for a transaction period, wherein the sender identifier and the recipient identifier are associated with the transaction and valid for the transaction period.

10. The computer program product of claim 9, wherein the computer executable code portions comprise the program code instructions configured to:
receive a transaction period adjustment indication; and
adjust the transaction period based on the transaction period adjustment indication.

11. The computer program product of claim 9, wherein the computer executable code portions comprise the program code instructions configured to further:
receive a first message from the sender;
associate the first message from the sender with the first transaction address;
cause a first transmission of the first message to the recipient using the first transaction address, wherein the first transaction address and the second transaction address are associated with the transaction and valid for the transaction period; and
receive a transaction complete indication.

12. The computer program product of claim 11, wherein the first message from the sender is associated with the second transaction address, wherein the computer executable code portions comprise the program code instructions configured to further associate the first message from the sender with a recipient address, wherein causing the first transmission of the first message from the sender to the recipient further comprises using the recipient address.

13. The computer program product of claim 11, wherein the computer executable code portions comprise the program code instructions configured to further:
receive a second message from the recipient;
associate the second message with the second transaction address; and
cause a second transmission of the second message to the sender using the second transaction address.

14. The computer program product of claim 13, wherein the second message is associated with the first transaction address, wherein the computer executable code portions comprise the program code instructions configured to further associate the second message with a sender address, wherein causing the second transmission of the second message to the sender is further based on the sender address.

15. A computer-implemented method for facilitating electronic correspondence between a sender and a recipient, comprising:
receiving a correspondence request indication;
assigning a transaction identifier to the correspondence request indication;
assigning a sender identifier to the sender and a recipient identifier to the recipient;
generating a first local part of a first transaction address based at least in part on dividing the sender identifier by the transaction identifier, wherein the first transaction address comprises the first local part and a first domain part;
generating a second local part of a second transaction address based at least in part on dividing the recipient identifier by the transaction identifier, wherein the second transaction address comprises the second local part and a second domain part; and
assigning the first transaction address to the sender and the second transaction address to the recipient.

16. The computer-implemented method of claim 15, wherein the transaction identifier is associated with a transaction and valid for a transaction period, wherein the sender identifier and the recipient identifier are associated with the transaction and valid for the transaction period.

17. The computer-implemented method of claim 16 further comprising:
receiving a transaction period adjustment indication; and
adjusting the transaction period based on the transaction period adjustment indication.

18. The computer-implemented method of claim 16 further comprising:
receiving a first message from the sender;
associating the first message from the sender with the first transaction address;
causing a first transmission of the first message to the recipient using the first transaction address, wherein the first transaction address and the second transaction address are associated with the transaction and valid for the transaction period; and
receiving a transaction complete indication.

19. The computer-implemented method of claim 18, wherein the first message from the sender is associated with the second transaction address, wherein the computer-implemented method further comprises associating the first message from the sender with a recipient address, wherein causing the first transmission of the first message from the sender to the recipient further comprises using the recipient address.

20. The computer-implemented method of claim 18 further comprising:
receiving a second message from the recipient;
associating the second message with the second transaction address; and
causing a second transmission of the second message to the sender using the second transaction address.

* * * * *